Aug. 2, 1949. L. G. COPEMAN 2,477,863
CREAM SEPARATOR
Filed Dec. 22, 1947
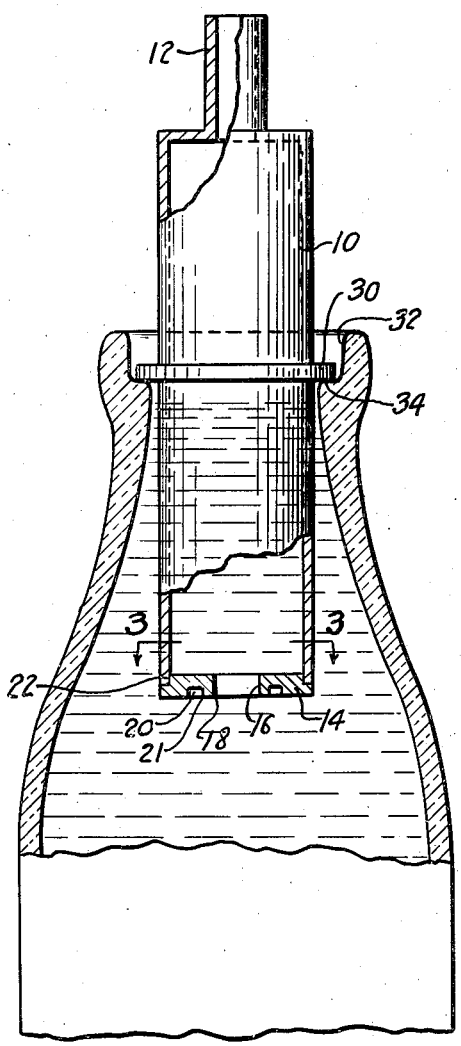
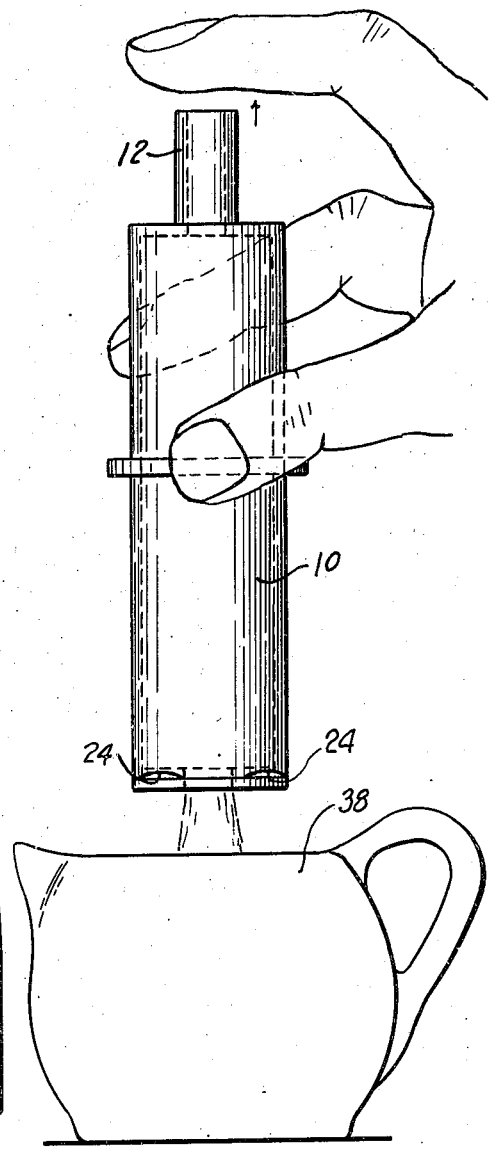
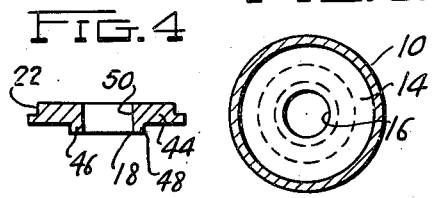
INVENTOR.
Lloyd G. Copeman
BY
Barnes, Kisselle, Laughlin
+ Raush
ATTORNEYS Patented Aug. 2, 1949

2,477,863

UNITED STATES PATENT OFFICE 2,477,863

CREAM SEPARATOR

Lloyd G. Copeman, Metamora, Mich., assignor to Copeman Laboratories Company, Flint, Mich., a corporation of Michigan Application December 22, 1947, Serial No. 793,257

4 Claims. (Cl. 210—51.5)

This invention relates to a cream separator and more particularly is intended to separate a quantity of cream at the top of a milk bottle so that it may be used independently of the contents of the bottle.

Various devices have been contrived for the separation of small quantities of cream from a milk bottle and for domestic use. The present invention contemplates a device which will remove a maximum quantity of cream when desired and permit ready transfer to a waiting pitcher or other container.

It is an object of the invention to provide a device which may remove a measured quantity of cream each time it is used and a device which is readily cleaned after each operation.

Another object of the invention is the provision of a construction in which cream may be carried in the separator without spilling.

Other objects and features of the invention will appear in the following description and claims.

Drawings accompany the specification and the respective figures therein may be briefly described as:

Figure 1, a partial section of a milk bottle showing the cream remover in place.

Figure 2, a view showing the manner in which cream is disposed in a waiting container.

Figure 3, a section view on line 3—3 of Figure 1.

Figure 4, a sectional view of a modified bottom cap.

The device which accomplishes the various objects and functions of the invention consists of a tubular body 10 which is preferably made of some type of transparent material such as plastic commonly in use. The tubular body 10 has a diameter which is slightly smaller than the opening at the mouth of a milk bottle. At the top of the tubular body 10 is a finger tube 12 either formed integrally with the body or connected thereto in air-tight relation. The finger tube is preferably reduced in size to minimize the quantity of air in the holder above the liquid level. The smaller the air volume, the better the vacuum that can be maintained.

The bottom end of the tube, as viewed in Figure 1, is open but an apertured bottom cap 14 is positioned therein to serve as a support for liquid within the body 10. The bottom cap 14 has a central opening 16 which has a diameter about ⅓ that of the body 10. It will be noted that the side walls of the opening 16 are straight and that the annular corner 18 of the opening is sharp in contour. Spaced from the aperture 16 but closely adjacent thereto is an annular groove 20 at the bottom surface of the cap 14. This groove 20 provides another corner 21 in the same plane but spaced from edge 18. An annular groove 22 is provided at the upper edge of the cap 14 to receive the lower edges of barrel 10. As shown best in Figure 2, small finger nail grooves 24 are provided in the outer surface of the tubular body 10.

The cap 14 is intended to have a frictional fit with the inside walls of the barrel. The cap may be readily removed by inserting the nail in the groove 24 to pry the cap from its position.

Surrounding the barrel or tubular body 10 is a ring 30 which has frictional engagement with the outside walls of the tube so that it may be shifted up and down. The ring 30 has outside diameter such that it will be received within the sealing cap recess 32 of a milk bottle but will rest on a shoulder 34 which supports a sealing cap. The diameter of the opening in tube 12 is such that it may be readily closed by the tip of the index finger.

In operation the lower end of the cream lifter is inserted into a milk bottle as the cap is removed and positioned by the locator ring 30 which will vary the position of the bottom of the cream lifter depending on the cream line and the amount of cream desired from any particular bottle. After insertion, the barrel of the cream lifter may be grasped by the thumb and middle finger and the opening of the tube 12 closed by the top of the index finger. When the device is then removed from the bottle no cream will fall therefrom until the index finger is removed from the tube 12 as shown in Figure 2, at which time the cream will flow freely from the bottom of the container into cream pitcher 38 or any suitable container.

I have found that the average person operating this device will seldom if ever keep it in a perpendicular position when removing cream from a bottle, but will invariably lean or tip the lifter one way or another, either while lifting the cream or in transferring it to another receptacle.

Leaning the lifter tends to disrupt the surface tension of the cream surrounding the opening in the bottom and this leaning of the barrel from the perpendicular has a direct relation to the diameter of this opening, which to permit speed of operation should be as large as possible.

The greater the angle of tipping the smaller the opening must be to prevent the leakage of cream through this opening. To offset this disadvantage I have designed a special opening which increases the surface tension at this critical point and permits a maximum diameter for this discharge opening together with a reasonable tipping allowance of the lifter without leaking cream.

Considering the surface tension of liquids, the critical point of tension is at the sharp lower edge of the discharge opening, and by forming a duplicate sharp edge parallel and adjacent to the first one the tension is greatly increased. Considerable added resistance to surface disruption at this point is provided.

In the embodiment shown in Figure 4, the cap 44 is much the same as cap 14 except that an annular projection 46 depends from the bottom of the cap and the secondary retaining edge is provided in corner 48 at the bottom of the central aperture 50.

It will thus be seen that I have provided a simple demonstration. For sanitary reasons the cream remover which is easily operable after a device must be cleaned after each use and this is readily accomplished by removal of the cap 14 as described after which there is ready access to all parts of the construction. The device has the further advantage of a locator ring 30 which supports the tube in the bottle thus preventing it from slipping to the bottom and permitting the removal of an exact amount of cream each time. The reduced section at the top of the lifter ensmalls the air chamber and insures greatest holding vacuum while the double edge bottom disc gives maximum surface tension at the opening.

What I claim is:

1. In a cream lifter of the type having a tubular member of a diameter to fit within a milk bottle neck and having an opening at one end thereof which may be conveniently closed with a finger tip, an apertured closure in the other end of said tube, said closure having an aperture axially parallel with said tube and a narrow annular projection coaxial with said aperture depending from the bottom of said closure and having a sharp annular edge at each diameter thereof, the inner diameter being that of the aperture.

2. In a cream lifter of the type having a tubular member having a diameter to fit within the neck of a milk bottle and provided with a finger tip opening at one end thereof, a bottom closure in said tube having an opening within the confines thereof ending in a sharp annular edge and a second sharp annular edge formed outside but in close spaced concentric relation to said first edge.

3. In a cream lifter of the type having a tubular member having a diameter to fit within the neck of a milk bottle and provided with a finger tip opening at one end thereof, a bottom closure in said tube having an opening within the confines thereof ending in a sharp annular edge, and a second sharp annular edge formed outside but in close spaced concentric relation to said first edge, both annular edges lying in a plane normal to the axis of said tubular member.

4. In a cream lifter of the type having a tubular member of a diameter to fit within a milk bottle neck and having an opening at one end thereof which may be conveniently closed with a finger tip, an apertured closure in the other end of said tube, said closure having a single circular aperture axially parallel with said tube, the outside surface of said closure being flat and having an annular groove with cylindrical walls parallel to the axis of said tube directly adjacent the aperture, the edge of the aperture and the inner edge of said groove each being relatively sharp.

LLOYD G. COPEMAN.

REFERENCES CITED

The following references are of record in the file of this patent:

UNITED STATES PATENTS

| Number | Name | Date |
| --- | --- | --- |
| 1,465,825 | Hurd | Aug. 21, 1923 |
| 1,469,211 | Kristofek | Oct. 2, 1923 |
| 1,473,104 | Jurgensen | Nov. 6, 1923 |
| 1,507,814 | Cooley | Sept. 9, 1924 |
| 2,250,363 | Edwards | July 22, 1941 |